(12) United States Patent
Kim et al.

(10) Patent No.: US 8,896,180 B2
(45) Date of Patent: Nov. 25, 2014

(54) SWITCHED RELUCTANCE MOTOR HAVING A VERTICAL MOVING COMMUTATOR

(75) Inventors: Byeong Han Kim, Gyunggi-do (KR); Chang Hwan Choi, Gyunggi-do (KR); Hee Soo Yoon, Gyunggi-do (KR); Han Kyung Bae, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 337 days.

(21) Appl. No.: 13/531,088

(22) Filed: Jun. 22, 2012

(65) Prior Publication Data
US 2013/0043763 A1 Feb. 21, 2013

(30) Foreign Application Priority Data
Aug. 19, 2011 (KR) ......................... 10-2011-0082851

(51) Int. Cl.
*H02K 13/10* (2006.01)
*H02K 13/12* (2006.01)

(52) U.S. Cl.
CPC ................ *H02K 13/10* (2013.01); *H02K 13/12* (2013.01)
USPC ............ 310/236; 310/233; 310/235; 310/237

(58) Field of Classification Search
CPC ..... H02K 13/006; H02K 13/10; H02K 13/12; H01R 39/46; H01R 39/04
USPC .................................. 310/233, 235, 236, 237
See application file for complete search history.

(56) References Cited

FOREIGN PATENT DOCUMENTS

| KR | 1003508070000 | * | 5/2002 | ............. H02K 19/06 |
|----|---------------|---|--------|------------------------|
| KR | 1007031760000 | * | 4/2007 | ............. H02K 13/10 |
| KR | 1010160150000 | * | 2/2011 | ............. H02K 37/02 |

OTHER PUBLICATIONS

English abstract of KR1007031760000, Won et al., Apr. 2007.*
English abstract of KR1003508070000, Choe, May 2002.*
English abstract of KR1010160150000, Kim, Feb. 2011.*

* cited by examiner

*Primary Examiner* — Terrance Kenerly
(74) *Attorney, Agent, or Firm* — Ladas & Parry, LLP (57) ABSTRACT

Disclosed herein is a switched reluctance motor including: a shaft rotatably supporting the switched reluctance motor in an axial direction; a cylindrical part provided at a central portion of the shaft and movable vertically; an elastic member formed to enclose the shaft, formed from an upper portion of the shaft to an upper portion of the cylindrical part to thereby support a rise of the cylindrical part, and having elasticity; commutator segments attached to an outer peripheral surface of the cylindrical part and having a cylindrical shape; brushes contacting or not contacting the commutator segments according to vertical movement of the cylindrical part; and a propeller provided on a lower portion of the cylindrical part and pushing air at the time of rotation to thereby move the cylindrical part upwardly.

18 Claims, 7 Drawing Sheets

Prior art

FIG.5

Prior art

FIG.6

Prior art

FIG.7

Prior art

FIG.8

Prior art

US 8,896,180 B2

SWITCHED RELUCTANCE MOTOR HAVING A VERTICAL MOVING COMMUTATOR

CROSS REFERENCE TO RELATED APPLICATION

This application claims the benefit of Korean Patent Application No. 10-2011-0082851, filed on Aug. 19, 2011, entitled "Switched Reluctance Motor", which is hereby incorporated by reference in its entirety into this application.

BACKGROUND OF THE INVENTION

1. Technical Field

The present invention relates to a switched reluctance motor.

2. Description of the Related Art

In a general switched reluctance motor (SRM), both of a stator and a rotor have magnetic structures, which is salient poles.

In addition, the stator has concentrated type coils wound therearound, and the rotor is configured only of an iron core without any type of excitation device (winding, permanent magnet, or the like), such that the competitive cost is excellent. Further, a speed changeable switched reluctance motor stably generates the continuous torque with the aid of a converter using power semiconductors and a position sensor and is easily controlled to be appropriate for the performance required in each application.

In addition, the switched reluctance motor is inexpensive due to a simple structure of the rotor; however, the switched reluctance motor has disadvantages because a converter formed of semiconductor switches should be used in order to generate the reluctance torque, a cost of the entire system increases, and an expensive control circuit capable of performing calculation at a high speed should be included in order to perform an appropriate control at the time of high speed driving.

Further, a universal motor that is mainly used in the field such as a vacuum cleaner, an electric power tool, or the like, generates the torque without a converter and a position sensor through the use of a commutator and a brush, which is a simple mechanical structure. The universal motor has widely been used in the field such as a vacuum cleaner, an electric power tool, or the like, due to an advantage in which it has a low cost structure rather than improvement in performance by a control. However, coils are wound around a rotor as well as a stator, such that the material cost increases and copper loss of the rotor occurs, thereby reducing efficiency of the motor. Therefore, it is difficult to apply the universal motor to a high level model requiring high efficiency.

Figure 4:
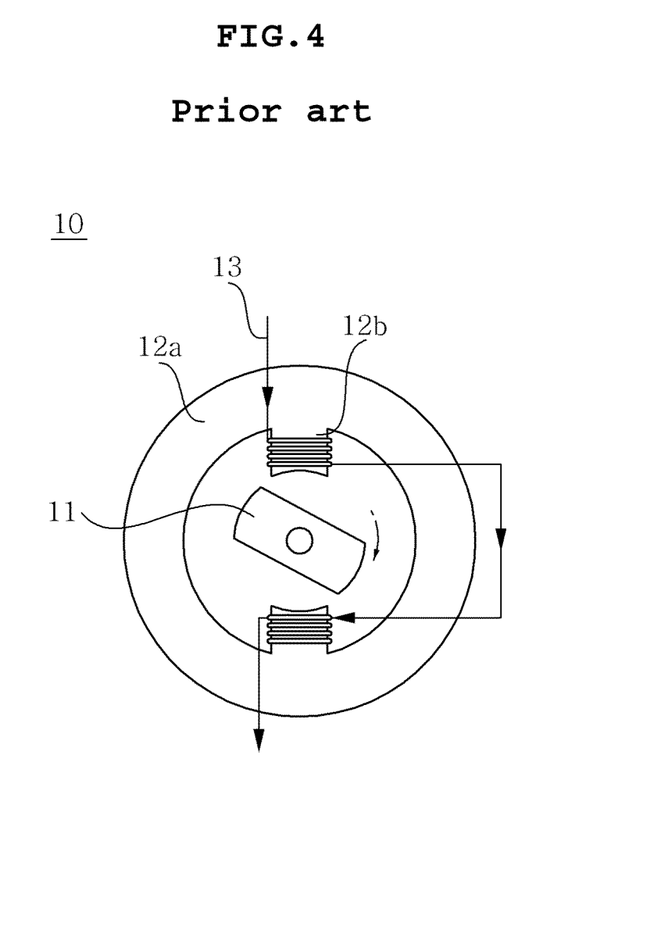
FIGS. 4 and 5 are schematic configuration views of a switched reluctance motor according to the prior art.

FIG. 4 is a schematic configuration view of a switched reluctance motor according to the prior art. As shown, the switched reluctance motor 10 in which only a single phase is shown includes a rotor 11, a stator 12a provided with a stator pole 12b, and a coil 13 wound around the stator pole 12b.

In addition, when a current is applied to the coil 13, a magnetic field is generated in the stator pole and attractive force is generated between the stator pole 12b and the rotor 11, such that the rotor 11 rotates.

In addition, when a plurality of phase windings are wound around a plurality of stator poles, each of the plurality of phase windings of the stator poles is excited to generate a torque, thereby rotating the rotor.

In this case, a position sensor is required since feedback for a position of the rotor is required, and a converter formed of power semiconductors is required in order to apply a current to the winding of the stator according to the position of the rotor. Furthermore, a controller including a digital signal processor (DSP), a microcontroller unit (MCU), or the like, mounted therein is required in order to perform complex and rapid calculation.

As described above, since the switched reluctance motor according to the related art should necessarily include the converter, the controller, and the position sensor in order to drive the motor, the switched reluctance motor may not be implemented at a low cost, a degree of freedom in design is deteriorated due to a complicated technical structure, and the possibility that a fault or an error will be generated is high.

FIGS. 5 to 8 show a switched reluctance motor according to the prior art. The switched reluctance motor according to the prior art includes a commutator segment and a brush mounted therein in order to remove a control device such as a semiconductor current converting device, an inverter, and the like, for controlling the switched reluctance motor. In the switched reluctance motor according to the prior art, since an advance angle and a dwell angle are mechanically fixed, self-starting may be performed by increasing a contact angle at the time of starting. However, because the advance angle and the dwell angle cannot be changed at the time of high speed driving, a flat-topped current may not be established and efficiency may not be improved.

Figure 5:
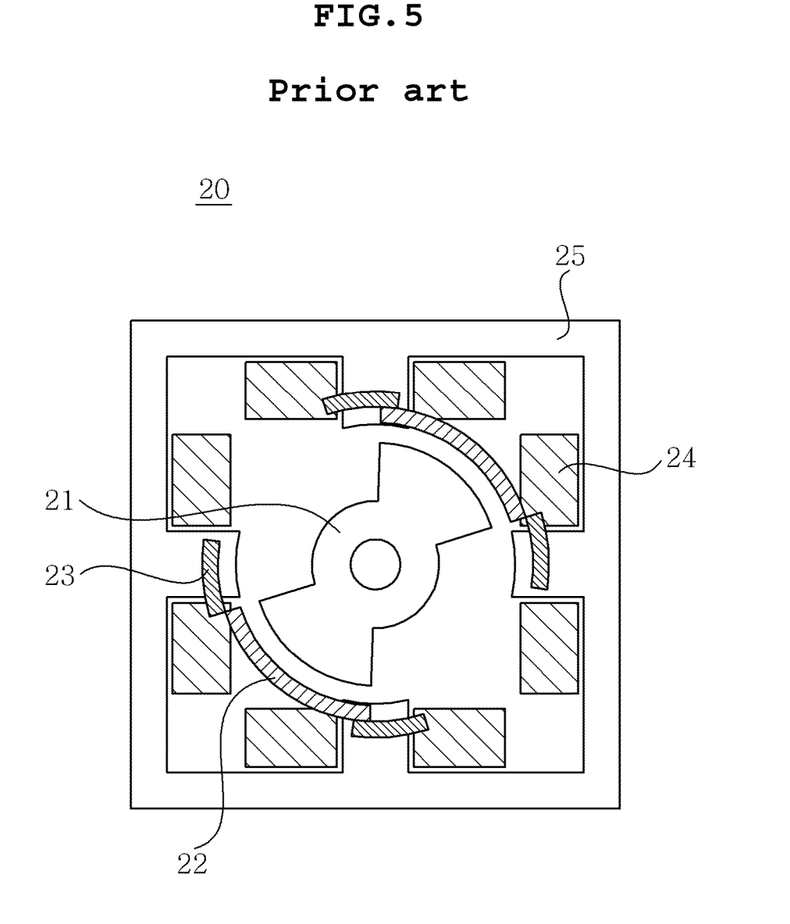

FIG. 5 is a schematic configuration view of a switched reluctance motor. As shown, the switched reluctance motor 20 includes a rotor 21, commutators 22, brushes 23, coils 24, and a stator 25.

More specifically, the rotor 21 includes the commutators 22 connected to both ends thereof, and is short-circuited to the commutators 22.

Here, the rotor is connected to two commutators 22 so that a central axis thereof coincides with those of the two commutators 22. In addition, the stator 25 and the rotor 21 is a salient pole type.

Further, two pairs of brushes 23 facing each other are provided and are fixed to the stator 25, the stator 25 includes two pairs of stator poles facing each other. In addition, each of two-phase coils 24 is wound around the stator pole.

The rotor 21 rotates to thereby mechanically contact the commutators 22.

Through the above-mentioned configuration, when the rotor 21 rotates, the commutators 22 having the same axis as that of the rotor 21 rotate together with the rotor 21. When the commutators 22 are positioned at a position at which an A phase winding shown as the coil 24 is to be excited, each of the commutators 22 mechanically contacts the brushes 23, such that a current flows therebetween, and when the commutators 22 are positioned at a position at which a B phase winding shown as the coil 24 is to be excited, each of the commutators 22 mechanically contacts the brushes 23, such that a current flows therebetween.

Figure 6:
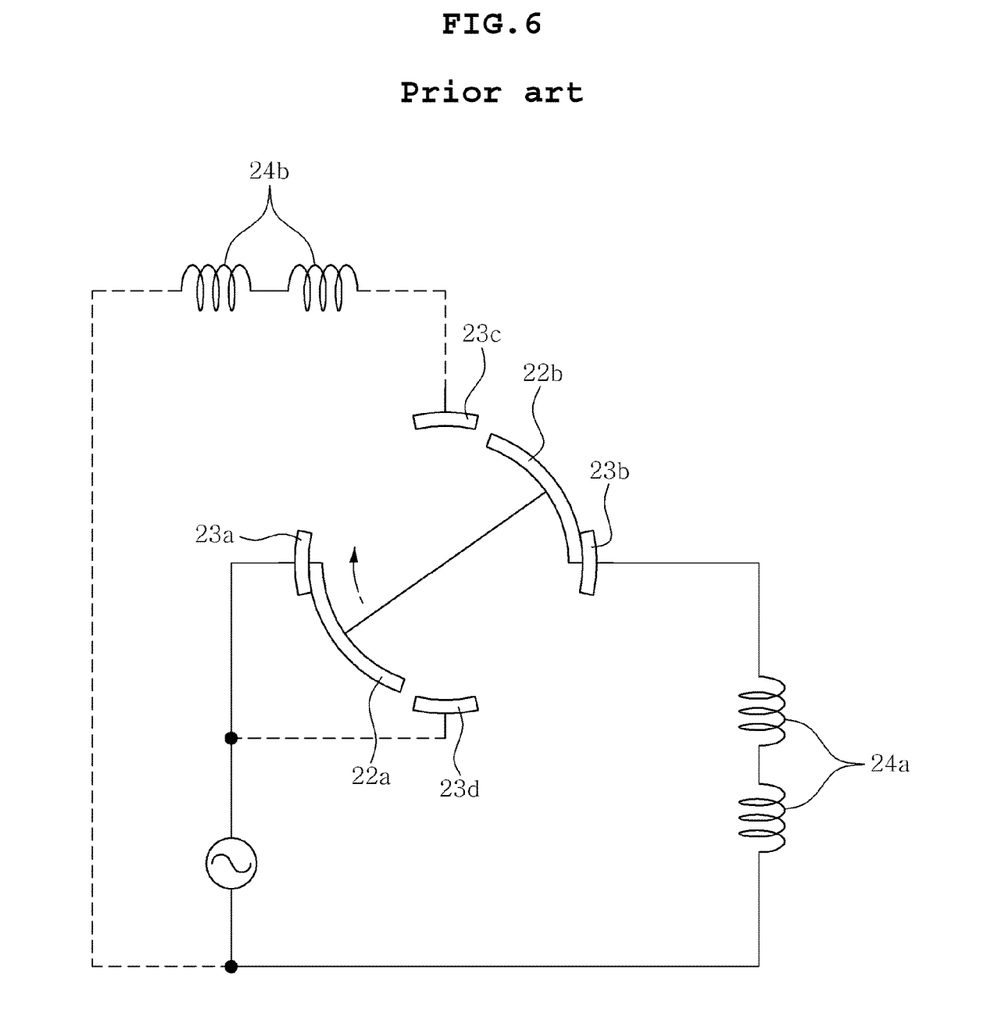
FIG. 6 is a schematic use state diagram according to excitation of an A phase coil in the switched reluctance motor according to the prior art.

FIG. 6 is an operating state schematic according to excitation of an A phase coil in a switched reluctance motor.

As shown, as each of commutators 22a and 22b contacts brushes 23a, 23b, 23c, and 23d, a voltage is applied, such that a current flows in coils 24a and 24b, which is an A phase. In this case, since the applied voltage is an alternate current (AC) voltage, each of voltages across each of the commutators 22a and 22b may have different polarities. That is, each of voltages across each of the commutators 22a and 22b may be a positive (+) voltage and a negative (−) voltage or be a negative (−) voltage and a positive (+) voltage.

Figure 7:
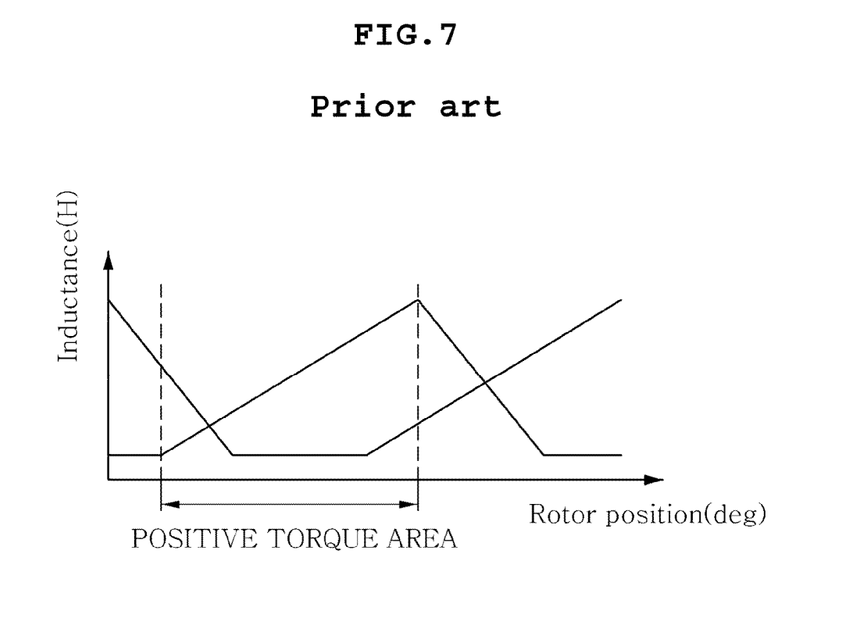
FIG. 7 is a graph showing an inductance according to a position of a rotor in the switched reluctance motor according to the prior art.
Figure 8:
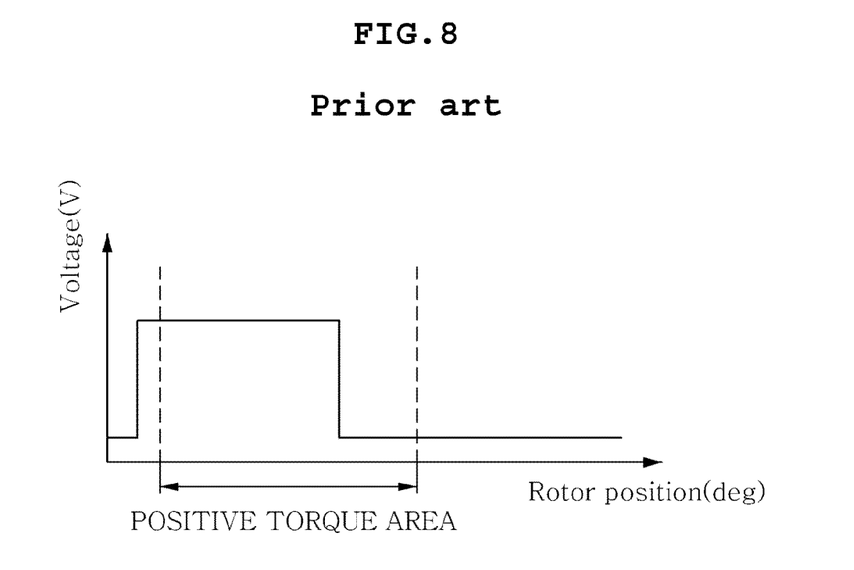
FIG. 8 is a graph showing voltage application according to a position of a rotor in the switched reluctance motor according to the prior art.

FIG. 7 is a graph showing an inductance according to a position of a rotor in a switched reluctance motor; and FIG. 8 is a graph showing voltage application according to a position of a rotor.

As shown, a current does not immediately arrive at a desired current value at the time of application of a voltage and is not immediately removed at the time of turn-off of the voltage, due to characteristics of an inductance. Therefore, it is important to design an advance angle for building up a current and a dwell angle at which a voltage is turned off before a negative torque is generated, in a minimum inductance period.

In addition, it is possible to implement roles of the position sensor and the converter according to the prior art through this.

More specifically, $$T(\theta, i) = \frac{1}{2} i^2 \frac{dL(\theta)}{d\theta},$$

Where T indicates a torque, θ indicates a position of a rotor, i indicates a phase current, and L indicate an inductance.

As seen in the above Equation, the torque is determined by a generated current and a change rate in inductance.

Therefore, the advance angle indicates an area from after application of a voltage to before an increase in the inductance. The voltage is applied by the advance angle and the inductance then increases, such that a positive torque area is formed.

Since the switched reluctance motor according to the prior art having the above-mentioned characteristics may not change the advance angle and the dwell angle particularly at the time of high speed driving thereof, it is impossible to drive the switched reluctance motor at a high speed or characteristics are deteriorated at the time of the high speed driving of the switched reluctance motor.

SUMMARY OF THE INVENTION

The present invention has been made in an effort to provide a switched reluctance motor capable of establishing a flat-topped current and improving efficiency even at the time of high speed rotation.

According to a preferred embodiment of the present invention, there is provided a switched reluctance motor including: a shaft rotatably supporting the switched reluctance motor in an axial direction; a cylindrical part provided at a central portion of the shaft and being movable vertically; an elastic member formed to enclose the shaft, formed from an upper portion of the shaft to an upper portion of the cylindrical part to thereby support a rise of the cylindrical part, and having elasticity; commutator segments attached to an outer peripheral surface of the cylindrical part and having a cylindrical shape; brushes contacting or not contacting the commutator segments according to vertical movement of the cylindrical part; and a propeller provided on a lower portion of the cylindrical part and pushing air at the time of rotation to thereby move the cylindrical part upwardly.

A portion of the shaft in which the cylindrical part moves may have an angled shape.

The elastic member may be an elastic body formed of a spring or a rubber material.

The commutator part may be made of a conductor and have a shape and an angle that are changed at the time of the vertical movement of the cylindrical part.

A plurality of commutator segments may be attached to the outer peripheral surface of the cylindrical part at equidistance.

A contact part between the brush and the commutator segment may be changed at the time of the vertical movement of the cylindrical part.

At the time of stop of the switched reluctance motor, the brush may be disposed over the commutator segment.

At the time of starting of the switched reluctance motor, as a speed of the switched reluctance motor increases, the commutator segment may move upwardly, the brush may relatively contact a lower portion of the commutator segment, an advance angle may increase, and a dwell angle may decrease.

According to another preferred embodiment of the present invention, there is provided a switched reluctance motor including: a shaft rotatably supporting the switched reluctance motor in an axial direction; a cylindrical part provided at a central portion of the shaft and being movable vertically; an elastic body connecting an upper portion of the shaft and an upper portion of the cylindrical part to each other; an elastic body connecting ball connected to the elastic body; commutator segments attached to an outer peripheral surface of the cylindrical part and having a cylindrical shape; and brushes contacting or not contacting the commutator segments according to vertical movement of the cylindrical part.

A portion of the shaft in which the cylindrical part moves may have an angled shape.

The elastic body may have elasticity, have a shape in which it is convex toward an outer side, and be formed in plural so as to be symmetrical to each other, and the elastic body connecting ball may be connected to a convex portion of the elastic body.

The commutator part may be made of a conductor and have a shape and an angle that are changed at the time of the vertical movement of the cylindrical part.

A plurality of commutator segments may be attached to the outer peripheral surface of the cylindrical part at equidistance.

A contact part between the brush and the commutator segment may be changed at the time of the vertical movement of the cylindrical part.

At the time of stop of the switched reluctance motor, the brush may be disposed over the commutator segment.

At the time of starting of the switched reluctance motor, as a speed of the switched reluctance motor increases, the commutator segment may move upwardly, the brush may relatively contact a lower portion of the commutator segment, an advance angle may increase, and a dwell angle may decrease.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 1:
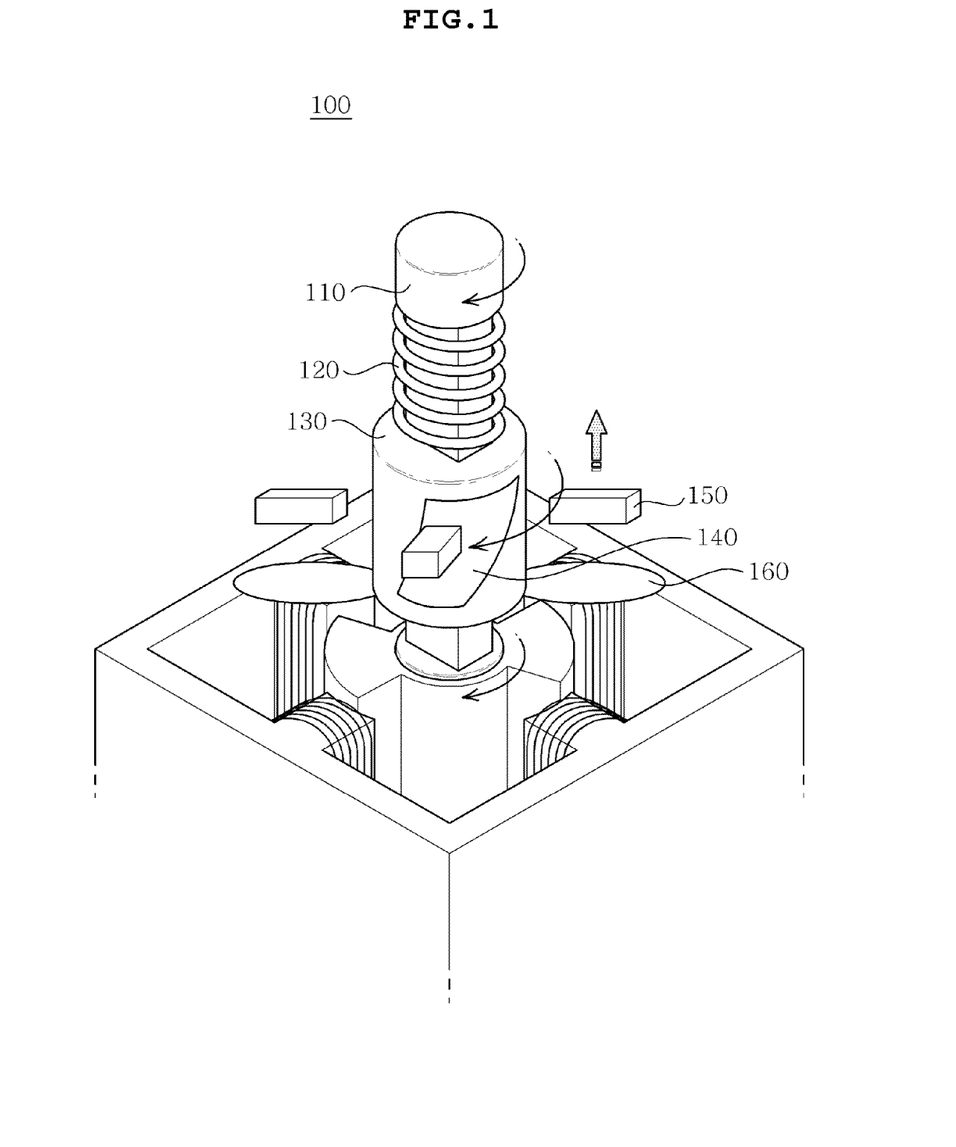
FIG. 1 is a perspective view showing a commutator and brush part of a switched reluctance motor according to a preferred embodiment of the present invention.
Figure 2:
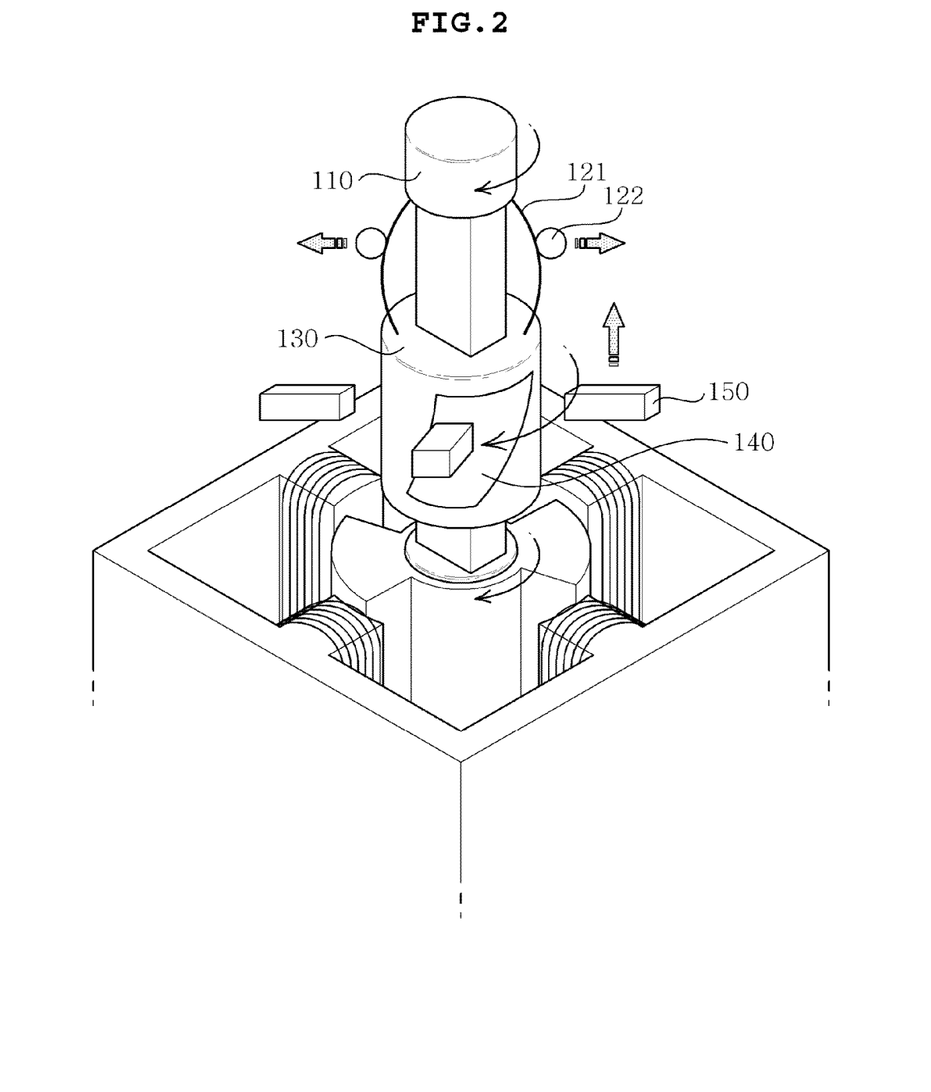
FIG. 2 is a perspective view showing a commutator and brush part of a switched reluctance motor according to another preferred embodiment of the present invention.
Figure 3:
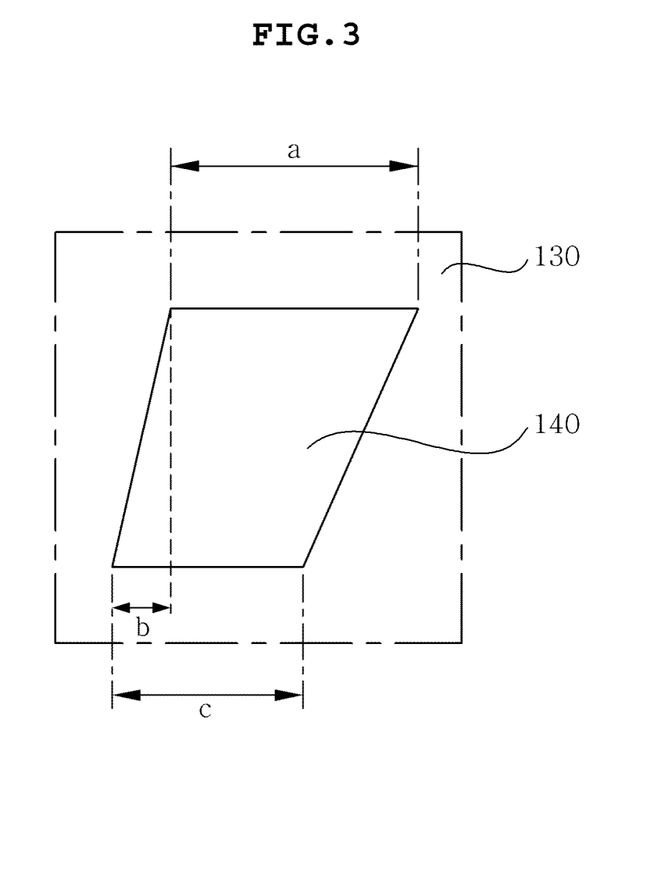
FIG. 3 is a partially enlarged view of a commutator of the switched reluctance motor according to the preferred embodiment of the present invention.

FIG. 1 is a perspective view showing a commutator and brush part 100 of a switched reluctance motor according to a preferred embodiment of the present invention; and FIG. 2 is a perspective view showing a commutator and brush part 100 of a switched reluctance motor according to another preferred embodiment of the present invention. In addition, FIG. 3 is a partially enlarged view of the commutator and brush part 100 of the switched reluctance motor according to the preferred embodiment of the present invention.

As shown in FIG. 1, the commutator and brush part 100 of the switched reluctance motor according to the preferred embodiment of the present invention is configured to include a shaft 110, an elastic member 120, a cylindrical part 130, commutator segments 140, brushes 150, and a propeller 160.

The shaft 110 is provided at the center of the switched reluctance motor to thereby allow the switched reluctance motor to be supported in an axial direction and to be easily rotated. A portion of the shaft 110 in which the cylindrical part 130 moves has an angled shape (for example a rectangular shape) rather than a cylindrical shape.

The elastic member 120 is formed to enclose the shaft 110 and is formed from an upper portion of the shaft 110 to an upper portion of the cylindrical part 130 to thereby serve to move the cylindrical part 130 attached to the shaft 110 vertically and maintain an interval at the time of stop of the switched reluctance motor. As the elastic member 120, an elastic body formed of a spring or a rubber material having elasticity may be provided.

The cylindrical part 130 is provided at a central portion of the shaft 110, may move vertically, and includes the commutator segments 140 attached to an outer peripheral surface thereof.

A plurality of commutator segments 140 are attached to the outer peripheral surface of the cylindrical part 130, and are preferably attached thereto at a predetermined interval. The cylindrical part 130 is preferably made of an insulator so that the commutator segments 140 are not electrically connected to each other due to contact between the commutator segments 140 and the brushes.

The contact between the commutator segments 140 and the brushes is switched, such that a coil in which a current is to flow is switched. The plurality of commutator segments 140 are preferably disposed at equidistance, that is, at the same interval. In addition, the number of commutator segments 140 is preferably the same as that of poles of the rotor.

The brushes 150 are provided at an outer side of the cylindrical part 130, such that they contact or do not contact the commutator segments 140 at the time of vertical movement of the cylindrical part 130.

Any one of a plurality of brushes 140 contacts the commutator segment 140 by rotation of the cylindrical part 130, and the plurality of brushes are connected to each other by coils. Since the plurality of brushes 140 correspond to a plurality of coil in an one-to-one scheme, the number of brushes is preferably the same as that of poles of the stator.

The plurality of brushes are preferably disposed at equidistance.

When the cylindrical part 130 moves vertically, a contact part between the brush 150 and the commutator part 140 changes while the commutator segment 140 attached to the cylindrical part 130 moves vertically together with the cylindrical part 130.

The commutator part 140 is made of a conductor (for example, copper) having a cylindrical shape, and an angle of the cylindrical shape changes at the time of vertical movement of the cylindrical part 130.

A detailed description for a change of the shape and the angle of the commutator part 140 will be provided below.

The propeller 160 is attached to the cylindrical part 130. At the time of rotation, the propeller 160 attached to the cylindrical part 130 pushes air, such that a contact surface between the brush 150 and the commutator part 140 changes while the commutator segment 140 moves to a position higher than that of the fixed brush 150.

The propeller 160 may have any shape and be made of any material as long as it may move according to the rotation.

FIG. 2 is a perspective view showing a commutator and brush part 100 of a switched reluctance motor according to another preferred embodiment of the present invention.

As shown in FIG. 2, the commutator and brush part 100 of the switched reluctance motor according to another preferred embodiment of the present invention is configured to include a shaft 110, an elastic body 121, an elastic body connecting ball 122, a cylindrical part 130, commutator segments 140, and brushes 150.

The commutator and brush part 100 of the switched reluctance motor according to another preferred embodiment of the present invention as shown in FIG. 2 has the same configuration and feature as those of the commutator and brush part 100 of the switched reluctance motor according to the above-mentioned preferred embodiment of the present invention except for the elastic body 121 and the elastic body connecting ball 122. Since the shaft 110, the cylindrical part 130, the commutator segments 140, and the brushes 150 have been described above, a detailed description thereof will be omitted.

The elastic body 121 and the elastic body connecting ball 122 shown in FIG. 2, which are components replacing the elastic member 120 and the propeller 160 of FIG. 1, has a length shortened by centrifugal force according to rotation.

The elastic body 121 is an elastic member connecting an upper portion of the shaft 110 and an upper portion of the cylindrical part 130 to each other, and is preferably formed in plural so as to be symmetrical to each other while having a curved shape in which it is convex toward an outer side.

The elastic body connecting ball 122 is connected to the outer side of the convex curved surface of the elastic body 121 and is provided in plural.

That is, the elastic body connecting ball 122 connected to the elastic body 121 having elasticity rotates, such that the commutator segment 140 moves upwardly while a rotating radius increases by centrifugal force.

The elastic body 121 is not specifically limited. That is, the elastic body may be made of any material and have any shape as long as the elastic body has the elastic body connecting ball 122 connected thereto and a rotating radius thereof increases by the elasticity at the time of rotation.

The elastic body 121 and the elastic body connecting ball 122 may be all elastic members (for example, a spring) elastically supporting the cylindrical part 130 at the time of vertical movement of the commutator segment 140.

FIG. 3 is an enlarged view of the cylindrical part 130 and the commutator segment 140 shown in FIGS. 1 and 2.

At the time of stop of the motor, since the propeller does not rotate, the brush (not shown) is disposed over the commutator segment 140. At this time, a dwell angle is a of FIG. 3.

At the time of starting of the motor, as a speed of the motor increases, the commutator segment 140 moves upwardly, the brush (not shown) relatively contacts a lower portion of the commutator segment 140, and an advance angle increases from 0 to b.

At the time of maximum speed of the motor, the advance angle becomes b and the dwell angle becomes c.

The dwell angle a at the time of initial starting of the motor, the advance angle b at the time of maximum speed of the motor, and the dwell angle c at the time of maximum speed of the motor may be controlled by the following relationship.

$$0 < b < a$$

$$0 < c <= a$$

The commutator and brush part 100 of the switched reluctance motor according to the preferred embodiment of the present invention having the above-mentioned structure may allow contact timing between the commutator segment 150 of the rotor and the brush 150 to be controlled according to a rotation speed.

That is, a contact angle is increased at the time of starting of the commutator and brush part 100 of the switched reluctance motor, thereby making it possible to perform self-starting, and changes the advance angle b and the dwell angle c at the time of high speed driving thereof, thereby making it possible to establish a flat-topped current and improve efficiency.

In addition, a control device such as a semiconductor current converting device, an inverter, and the like is removed in the switched reluctance motor, thereby making it possible to significantly reduce a manufacturing cost.

Although the preferred embodiments of the present invention have been disclosed for illustrative purposes, they are for specifically explaining the present invention and thus a switched reluctance motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A switched reluctance motor comprising:
a shaft rotatably supporting the switched reluctance motor in an axial direction;
a cylindrical part provided at a central portion of the shaft and being movable vertically;
an elastic member formed to enclose the shaft, formed from an upper portion of the shaft to an upper portion of the cylindrical part to thereby support a rise of the cylindrical part, and having elasticity;
commutator segments attached to an outer peripheral surface of the cylindrical part and having a cylindrical shape;
brushes contacting or not contacting the commutator segments according to vertical movement of the cylindrical part; and
a propeller provided on a lower portion of the cylindrical part and pushing air at the time of rotation to thereby move the cylindrical part upwardly.

2. The switched reluctance motor as set forth in claim 1, wherein a portion of the shaft in which the cylindrical part moves has an angled shape.

3. The switched reluctance motor as set forth in claim 1, wherein the elastic member is an elastic body formed of a spring or a rubber material.

4. The switched reluctance motor as set forth in claim 1, wherein the commutator part is made of a conductor and has a shape and an angle that are changed at the time of the vertical movement of the cylindrical part.

5. The switched reluctance motor as set forth in claim 1, wherein a plurality of commutator segments are attached to the outer peripheral surface of the cylindrical part at equidistance.

6. The switched reluctance motor as set forth in claim 1, wherein a contact part between the brush and the commutator segment is changed at the time of the vertical movement of the cylindrical part.

7. The switched reluctance motor as set forth in claim 1, wherein at the time of stop of the switched reluctance motor, the brush is disposed over the commutator segment.

8. The switched reluctance motor as set forth in claim 1, wherein at the time of starting of the switched reluctance motor, as a speed of the switched reluctance motor increases, the commutator segment moves upwardly, the brush relatively contacts a lower portion of the commutator segment, an advance angle increases, and a dwell angle decreases.

9. The switched reluctance motor as set forth in claim 1, wherein at the time of starting of the switched reluctance motor, as a speed of the switched reluctance motor increases, the commutator segment moves upwardly, the brush relatively contacts a lower portion of the commutator segment, an advance angle increases, and a dwell angle is constant.

10. A switched reluctance motor comprising:
a shaft rotatably supporting the switched reluctance motor in an axial direction;
a cylindrical part provided at a central portion of the shaft and being movable vertically;
an elastic body connecting an upper portion of the shaft and an upper portion of the cylindrical part to each other;
an elastic body connecting ball connected to the elastic body;

commutator segments attached to an outer peripheral surface of the cylindrical part and having a cylindrical shape; and brushes contacting or not contacting the commutator segments according to vertical movement of the cylindrical part.

11. The switched reluctance motor as set forth in claim 10, wherein a portion of the shaft in which the cylindrical part moves has an angled shape.

12. The switched reluctance motor as set forth in claim 10, wherein the elastic body has elasticity, has a shape in which it is convex toward an outer side, and is formed in plural so as to be symmetrical to each other, and the elastic body connecting ball is connected to a convex portion of the elastic body.

13. The switched reluctance motor as set forth in claim 10, wherein the commutator part is made of a conductor and has a shape and an angle that are changed at the time of the vertical movement of the cylindrical part.

14. The switched reluctance motor as set forth in claim 10, wherein a plurality of commutator segments are attached to the outer peripheral surface of the cylindrical part at equidistance.

15. The switched reluctance motor as set forth in claim 10, wherein a contact part between the brush and the commutator segment is changed at the time of the vertical movement of the cylindrical part.

16. The switched reluctance motor as set forth in claim 10, wherein at the time of stop of the switched reluctance motor, the brush is disposed over the commutator segment.

17. The switched reluctance motor as set forth in claim 10, wherein at the time of starting of the switched reluctance motor, as a speed of the switched reluctance motor increases, the commutator segment moves upwardly, the brush relatively contacts a lower portion of the commutator segment, an advance angle increases, and a dwell angle decreases.

18. The switched reluctance motor as set forth in claim 10, wherein at the time of starting of the switched reluctance motor, as a speed of the switched reluctance motor increases, the commutator segment moves upwardly, the brush relatively contacts a lower portion of the commutator segment, an advance angle increases, and a dwell angle is constant.

\* \* \* \* \*